United States Patent [19]

Nagashima

[11] Patent Number: 4,535,910

[45] Date of Patent: Aug. 20, 1985

[54] TANK CAP FOR POWERED MACHINE

[75] Inventor: Akira Nagashima, Kawasaki, Japan

[73] Assignee: Kioritz Corporation, Tokyo, Japan

[21] Appl. No.: 643,378

[22] Filed: Aug. 23, 1984

[30] Foreign Application Priority Data

Aug. 30, 1983 [JP] Japan .................. 58-133121[U]

[51] Int. Cl.³ ............................................. B65D 51/00
[52] U.S. Cl. .................. 220/377; 220/82 R; 116/227
[58] Field of Search ............ 220/82 R, 377; 116/227; 73/324, 330, 334; 184/15 R

[56] References Cited

U.S. PATENT DOCUMENTS 3,518,962  7/1970  De Leu et al. .................. 73/334
3,776,369 12/1973  Schrack et al. .................. 184/15 R
3,837,433  9/1974  Combs, Jr. et al. ............. 184/15 R Primary Examiner—George T. Hall
Attorney, Agent, or Firm—Karl W. Flocks; Sheridan Neimark

[57] ABSTRACT

A tank cap for closing the filling port of a fuel or lubricating oil tank of a power-driven portable machine such as a chain saw. The tank cap is made of a transparent plastic material and is provided with a protrusion protruding outwardly from the main surface of the tank cap. The cavity formed in the protrusion is communicated with the tank filling port so that the fuel or lubricating oil is allowed to come into this cavity. Consequently, the fuel or lubricating oil level can be visually checked from all directions around the tank cap.

2 Claims, 4 Drawing Figures

F I G. 2
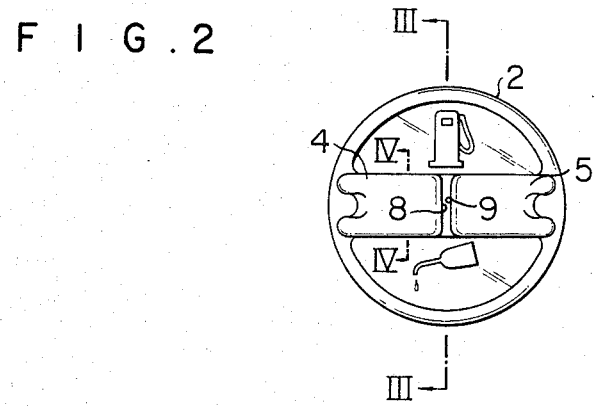
F I G. 3
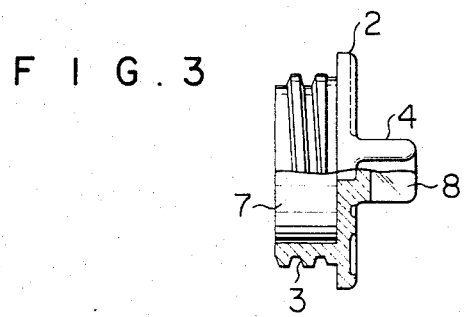
F I G. 4
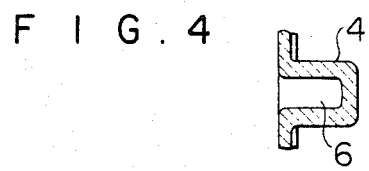

TANK CAP FOR POWERED MACHINE

BACKGROUND OF THE INVENTION

The present invention broadly relates to power-driven machines, particularly portable type machines having an internal combustion engine and tanks for storing fuel and lubricating oil. More particularly, the invention is concerned with an improved construction of a tank cap attached to the tank of power-driven machines of the type described.

Portable power-driven machines such as a chain saw, grass trimmer, powered sprayer and so forth are well known. For the purpose of simplification in the construction, these portable power-driven machines usually do not have a level gauge or meter which would indicate the amount of fuel or lubricating oil remaining in the tank. Therefore, the user has no means allowing him to confirm the amount of fuel or lubricating oil remaining in the tank during the operation of the machine, often resulting in a short-fall of fuel or lubricating oil during the work. A short-fall of fuel or lubricating oil causes an extremely dangerous situation in some kinds of work.

SUMMARY OF THE INVENTION

Accordingly, it is a primary object of the invention to provide a tank cap for a power-driven machine, improved so that it also plays the role of a liquid-level gauge or meter such as to enable the user to confirm the amount of fuel or lubricating oil remaining without the necessity for any additional part, thereby obviating the above-described problems of the prior art.

To this end, according to the invention, there is provided a tank cap for closing the filling port of a tank mounted on a power-driven machine having an internal combustion engine, the tank containing a fuel or lubricating oil to be supplied to the engine, wherein the improvement comprises the fact that the tank cap is made of a transparent plastic material and has a protrusion protruding outwardly from the main surface of the cap, the protrusion defining therein a cavity communicating with the interior of the filling port of the tank such as to allow the fuel or lubricating oil to enter the cavity.

According to one form of the invention, the protrusion extends substantially diametrically of the main surface of the tank cap.

According to another form of the invention, the protrusion is constituted by two parts extending along a common diametrical line of the main surface of the tank cap and separated from each other by end walls defining radially inner ends of the two parts of the protrusion, the end walls being made integral with each other to constitute a central stiffening wall.

Thus, the tank cap of the invention has a double role: namely, it serves as a closure member for closing the tank filling port and also as a level indicator which enables the user to visually check the amount of liquid remaining in the tank without requiring any additional separate level indicator.

The tank cap of the invention has quite a simple construction and, therefore, can be fabricated without difficulty.

The above and other objects of the invention will become clear from the following description of the preferred embodiment when the same is read in conjunction with the accompanying drawings.

BRIEF DESCRIPTION OF THE DRAWINGS

FIG. 2 is a front elevational view of the tank cap as shown in FIG. 1;

FIG. 3 is a sectional view taken along the line III—III of FIG. 2; and

FIG. 4 is a sectional view taken along the line IV—IV of FIG. 2.

DESCRIPTION OF THE PREFERRED EMBODIMENT

Figure 1:
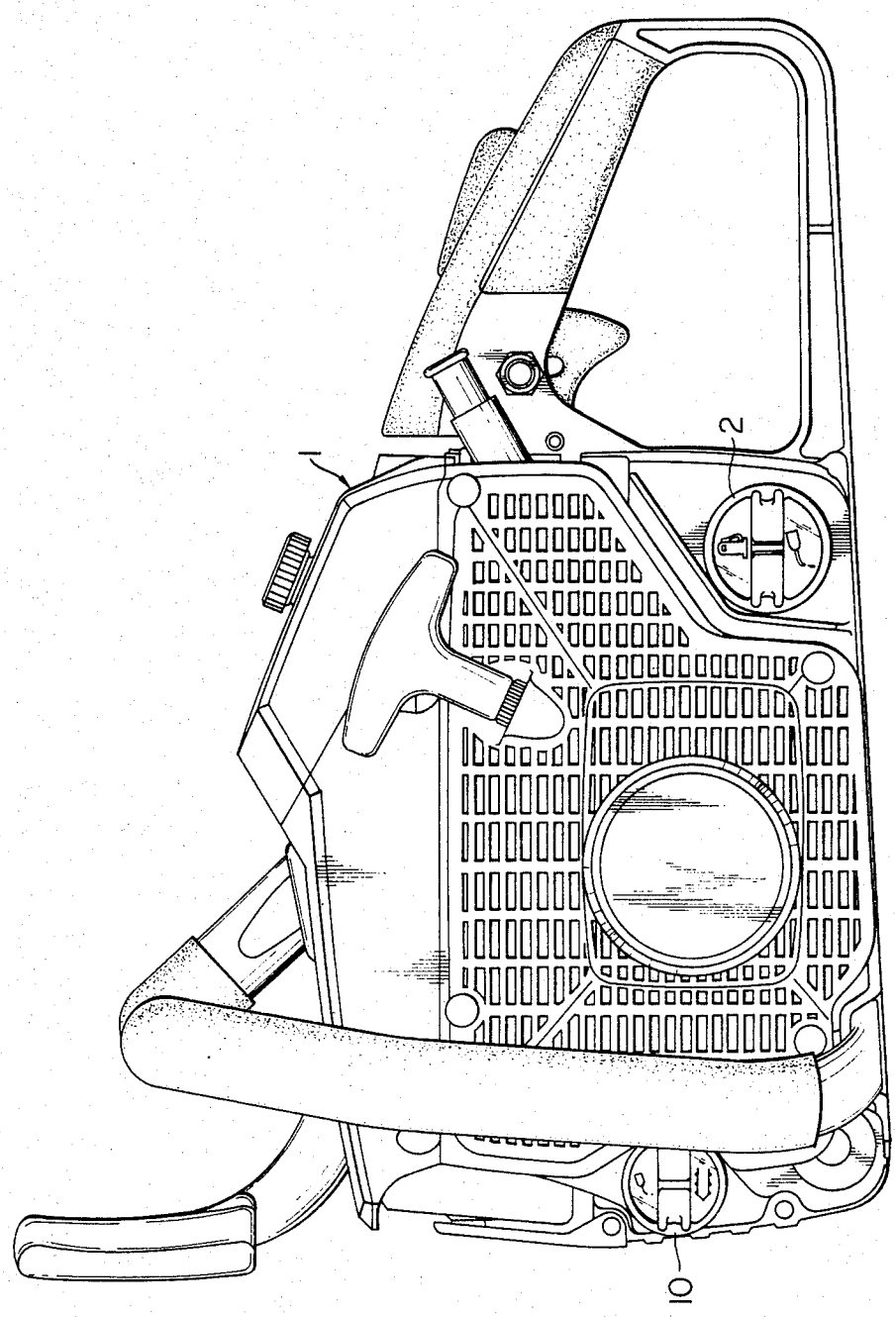
FIG. 1 is a side elevational view of a chain saw provided with a tank cap in accordance with the invention.

An embodiment of the invention will be described hereinunder with reference to the drawings.

FIG. 1 shows a chain saw 1 having a tank cap in accordance with the invention. The chain saw has a small-sized internal combustion engine (not shown) and a saw chain adapted to be driven by the engine. The chain saw 1 further has a tank (not shown) for storing the fuel which is to be supplied to the engine. The tank has a filling port opening at one side of the frame of the chain saw and usually closed with a tank cap 2 in accordance with the invention.

The tank cap 2 is generally formed of a transparent plastic material and is provided with a male screw thread adapted to engage with a female screw thread 3 formed in the brim of the filling port of the tank. The tank cap 2 is provided on the outer surface thereof with a pair of axially outward protrusions 4 and 5 which extend diametrically of the body of the tank cap. The cavity 6 in the protrusions 4 and 5 opens to the interior 7 of the body of the tank cap 2 and, hence, communicates with the filling port of the tank.

As will be seen from FIG. 1, the filling port to which the tank cap 2 is attached is located at a comparatively lower portion of the tank. Therefore, in the ordinary state of use of the machine in which the tank is adequately filled, the fuel level is positioned well above the filling port, i.e., the tank cap 2, so that the interior 7 of the cap body, as well as the cavity 6 in the protrusions 4, 5, is filled with the liquid fuel. As the fuel is consumed, the liquid level in the tank drops to the level of the cavity 6 in the protrusions 4, 5 to become visible through the transparent material constituting the protrusions 4, 5. As the fuel is further consumed, the liquid level drops below the protrusions 4, 5 and becomes invisible through the protrusions 4, 5. This drop in the liquid level can be visually checked from all directions around the tank cap 2 because of the presence of the transparent protrusions.

The protrusions 4, 5 in the described embodiment can serve also as a knob or finger retainer. In the illustrated embodiment, the walls 8 and 9 defining the radially inner ends of the protrusions 4 and 5 are adjoined to each other to stiffen the protrusions 4 and 5. Therefore, the user can nip and twist the protrusions 4, 5 by the fingers when screwing and unscrewing the tank cap 2 into and out of the filling port without any fear of breakdown.

Although the protrusions 4 and 5 in the described embodiment are partitioned by the central walls 8, 9, this arrangement is not exclusive and the protrusions 4 and 5 may be constructed as a continuous diametrically-extending protrusion protruding axially from the main plane of the tank cap 2.

The chain saw shown in FIG. 1 is provided with another tank cap 10 which fits in the filling port of a saw chain lubricating oil tank (not shown). This tank cap 10 may have the same construction as the cap 2.

Although the tank caps 2 and 10 are positioned at comparatively lower parts of the respective tanks, this does not cause any problem in filling the tanks because the power-driven machine to which the invention applies can easily be turned sideways so as to direct the tank filling ports upwardly.

Although the invention has been described through specific terms, it is to be noted here that the described embodiment is not exclusive and various changes and modifications may be imparted thereto without departing from the scope of the invention which is limited solely by the appended claims.

What is claimed is:

1. A tank cap for closing the filling port of a tank mounted on a power-driven machine having an internal combustion engine, said tank containing a fuel to be supplied to said engine or lubricating oil, wherein the improvement comprises that said tank cap is made of a transparent plastic material and has a protrusion protruding outwardly from the main surface of said cap, said protrusion defining therein a cavity communicating with the interior of said filling port of said tank such as to allow said fuel or lubricating oil to enter said cavity, and wherein said protrusion is constituted by two parts extending along a common diametrical line of the main surface of said tank cap and separated from each other by end walls defining radially inner ends of said parts of the protrusion, said end walls being made integral with the cap so as to constitute a central stiffening wall.

2. A tank cap according to claim 1, wherein said protrusion extends substantially diametrically of the main surface of said tank cap.

* * * * *